US005913172A

United States Patent [19]

McCabe et al.

[11] Patent Number: 5,913,172

[45] Date of Patent: Jun. 15, 1999

[54] METHOD AND APPARATUS FOR REDUCING PHASE CANCELLATION IN A SIMULCAST PAGING SYSTEM

[75] Inventors: Michael J. McCabe; Lee I. Williams, both of Quincy, Ill.; Paul A. Goud, Coquitlam, Canada

[73] Assignee: Glenayre Electronics, Inc., Blaine, Wash.

[21] Appl. No.: 08/751,226

[22] Filed: Nov. 15, 1996

[51] Int. Cl.[6] .............................. H04B 7/005; H04B 7/26

[52] U.S. Cl. .............................................. 455/503; 455/552

[58] Field of Search ..................................... 455/426, 458, 455/503, 524, 114, 115, 502, 552, 553, 38.1; 370/321, 330, 436, 478; 375/202

[56] References Cited

U.S. PATENT DOCUMENTS

| | | | |
|---|---|---|---|
| 1,881,483 | 10/1932 | Gillett . | |
| 4,232,392 | 11/1980 | French . | |
| 4,570,265 | 2/1986 | Thro . | |
| 4,972,410 | 11/1990 | Cohen et al. . | |
| 5,218,717 | 6/1993 | Reitberger . | |
| 5,335,537 | 8/1994 | Fennell et al. . | |
| 5,353,307 | 10/1994 | Lester et al. . | |
| 5,369,784 | 11/1994 | Nelson . | |
| 5,390,166 | 2/1995 | Rohani et al. | 375/200 |
| 5,416,808 | 5/1995 | Witsaman et al. | 455/503 |
| 5,418,818 | 5/1995 | Marchetto et al. . | |

OTHER PUBLICATIONS

L. Williams, "System Integration of the Flex Paging Protocol," *Mobile Radio Technology*, Jun. 1996, pp. 10–26, (Part I).

L. Williams, "System Integration of the Flex Paging Protocol," *Mobile Radio Technology*, Jul. 1996, pp. 12–18 (Part II).

*Primary Examiner*—Nguyen Vo

*Attorney, Agent, or Firm*—Christensen O'Connor Johnson Kindness PLLC

[57] ABSTRACT

A transmitter includes a modulator, a power amplifier and a controller to reduce the effects of phase cancellation in a simulcast paging system. The modulator is digitally configurable to modulate according to at least two protocols. The controller configures the modulator for a first protocol and provides to the modulator a signal to be broadcast. The modulator then modulates this signal according to the first protocol and causes the modulator to introduce a random frequency offset within a frequency range predetermined to optimally reduce phase cancellation for the first protocol. When the controller provides a signal to be broadcast according to a second protocol, the controller reconfigures the modulator for the second protocol. In addition the controller causes the modulator to introduce a random frequency offset within a predetermined range to optimally reduce phase cancellation for the second protocol. Because the controller can change the frequency offset on a protocol basis, phase cancellation errors can be optimally reduced for both protocols. In addition, the transmitter can easily be reconfigured to support new protocols as they are developed without changing the existing transmitter hardware. Still further, the randomly changing offsets dispense with the need to maintain records of the offsets for each transmitter in the simulcast paging system.

41 Claims, 9 Drawing Sheets

METHOD AND APPARATUS FOR REDUCING PHASE CANCELLATION IN A SIMULCAST PAGING SYSTEM

FIELD OF THE INVENTION

The present invention relates to radio frequency (RF) communication systems and, more particularly, to paging systems. Still more particularly, the present invention is related to a method and apparatus for reducing the effects of phase cancellations in overlap regions of a simulcast paging system and for increasing the ease-of-use of the system.

BACKGROUND

Simulcast paging systems are well known in the art of paging communication systems. For example, U.S. Pat. No. 5,369,682, assigned to the same assignee as the present invention and incorporated herein by reference, discloses a digital simulcast paging system. In general, such a system includes a paging switch connected to the public switched telephone network, and a plurality of base stations. A caller wishing to page a subscriber of the paging system calls the paging switch using the public switched telephone network (PSTN). The paging switch then formulates a page to the subscriber and distributes the page to each of the paging base stations. The paging base stations then simultaneously broadcast (simulcast) the page. The subscriber receives the page through a personal paging unit (or "pager") that the subscriber carries.

In addition, paging transmitters may include the capability of transmitting pages according to multiple paging protocols. Further, pages with different protocols may be time multiplexed to increase throughput and decrease the system's costs. An example of such a transmitter is disclosed in co-pending and commonly assigned U.S. patent application Ser. No. 08/601,118 entitled "Digital Linear Transmitter Using Predistortion", which is incorporated herein by reference. Thus, for example, a paging transmitter may be capable of transmitting pages according to both POCSAG and FLEX™ protocols.

In a simulcast paging system, difficulty can arise in those geographic areas that can receive signals from more than one paging station. These geographic areas are also known as the "overlap regions." In these overlap regions a phase cancellation phenomenon can be observed. The phase cancellation condition occurs as signals from more than one base station are received in an overlap region. Due to the increased accuracy and stability of the present generation of transmitters, the phase cancellation condition has become an issue of even greater concern. More specifically, because these high accuracy transmitters each output almost precisely identical frequencies in the page signals, at certain locations within the overlap regions, the signals are 180° out of phase, thereby canceling each other out. These phase cancellation areas are commonly referred to as "standing null points" within the overlap region.

Some conventional systems attempt to alleviate the above phase cancellation problem by using a fixed frequency offset between adjacent transmitters. Properly chosen, the fixed frequency offset prevents "standing null points" in the overlap regions without degrading the system performance beyond acceptable levels. More specifically, the fixed frequency offset between adjacent transmitters causes the null points within the overlap area to move. The phase cancellation condition is believed to occur periodically at a given location in the simulcast overlap environment at a rate of $1/f_0$, where $f_0$ is the frequency offset (i.e., the frequency difference between the received signals). In general, the duration of the phase cancellation condition at the given location is inversely proportional to the offset frequency $f_0$. Thus, if a pager is placed in the overlap region, a relatively short duration phase cancellation condition occurs at a rate of $1/f_0$. However, because a subscriber may often remain at a certain location for relatively long periods of time, this conventional solution may not be acceptable. For example, if the subscriber remains at a fixed location, a page to this subscriber periodically will suffer significant phase cancellation at the $1/f_0$ rate, which could introduce errors in the received page.

Another significant problem with fixed offset schemes is that records of the offsets for each transmitter must be stored and maintained so as to ensure that the offsets for adjacent transmitters are different. As protocols change and equipment is updated, this bookkeeping task adds further complexity and cost to the system.

In addition to fixed offset schemes, there are some conventional offset schemes that introduce a frequency offset with random frequencies. For example, such a scheme is described in U.S. Pat. No. 4,570,265 issued to Thro, Feb. 11, 1986. This type of conventional scheme generally uses a hardware random noise source for generating a noise signal which is amplified and low-passed filtered before application separately or in combination with an information signal to a frequency modulation input lead of a corresponding modulator. Therefore, communications between a central station and mobile receivers located in overlap areas will not be interrupted by the nulls for long periods of time.

Although these conventional schemes provide some benefits, these conventional schemes still have shortcomings. For example, the offset generating hardware used in the above conventional schemes cannot be easily changed once implemented. Thus, in the multiple protocol paging systems, the above conventional offset schemes are not self-configurable to provide optimize frequency offset ranges on a protocol basis. Furthermore, these conventional schemes cannot be readily reconfigured to optimize performance if the protocol(s) are modified. Still further, the hardware used in these conventional systems generally do not allow for specific control of the frequency range, randomness, duration and timing of the randomly changing frequency offset.

SUMMARY

In accordance with the present invention, a method and apparatus for reducing the effects of phase cancellation in a simulcast broadcast system is provided. In one embodiment, the method and apparatus are implemented in a RF transmitter having a modulator, a power amplifier and a controller. The modulator is capable of modulating according to at least two protocols. The controller configures the modulator for a first protocol and provides to the modulator a signal to be broadcast, which the modulator then modulates according to the first protocol. The controller causes the modulator to introduce a frequency offset predetermined to optimally reduce the effects of phase cancellation for the first protocol. When the controller provides a signal to be broadcast according to the second protocol, the controller reconfigures the modulator for the second protocol. In addition the controller causes the modulator to introduce a frequency offset predetermined to optimally reduce the effects of phase cancellation for the second protocol. Because the controller can change the offset on a protocol basis, phase cancellation errors can be optimally reduced for both protocols.

In another aspect of the present invention, the frequency offsets are randomly generated within a frequency range that has been predetermined to minimize phase cancellation for the current protocol. Because the frequency offset randomly changes, there is no need to maintain records of the frequency offsets for each transmitter in the system, unlike the conventional fixed offset schemes. Thus, this aspect of the present invention provides ease-of-use in that the aforementioned bookkeeping requirement is eliminated.

In yet another aspect of the present invention, the predetermined frequency offset ranges are digitally reconfigurable. More specifically, a digital signal processing device is used for modulation, which allows the frequency offsets and ranges to be easily changed by simply reprogramming the digital signal processing device. Thus, no hardware changes are needed. Accordingly, as new protocols are developed, these protocols can migrate into existing paging systems (with the corresponding optimal frequency offsets) without changing the transmitter hardware. In a further refinement, the digital signal processing device can be reprogrammed remotely, eliminating the need for an operator to physically visit the transmitters (which may be located in hard to reach areas) for reprogramming. In still a further refinement, the programmable digital signal processing device can be configured to allow control of the rate, duration, and timing of the randomization of the frequency offsets and ranges. That is, the duration at which modulation occurs at a given randomized offset frequency may be programmed and controlled to an optimal setting, or the resting time itself may be randomized.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION

Figure 1:
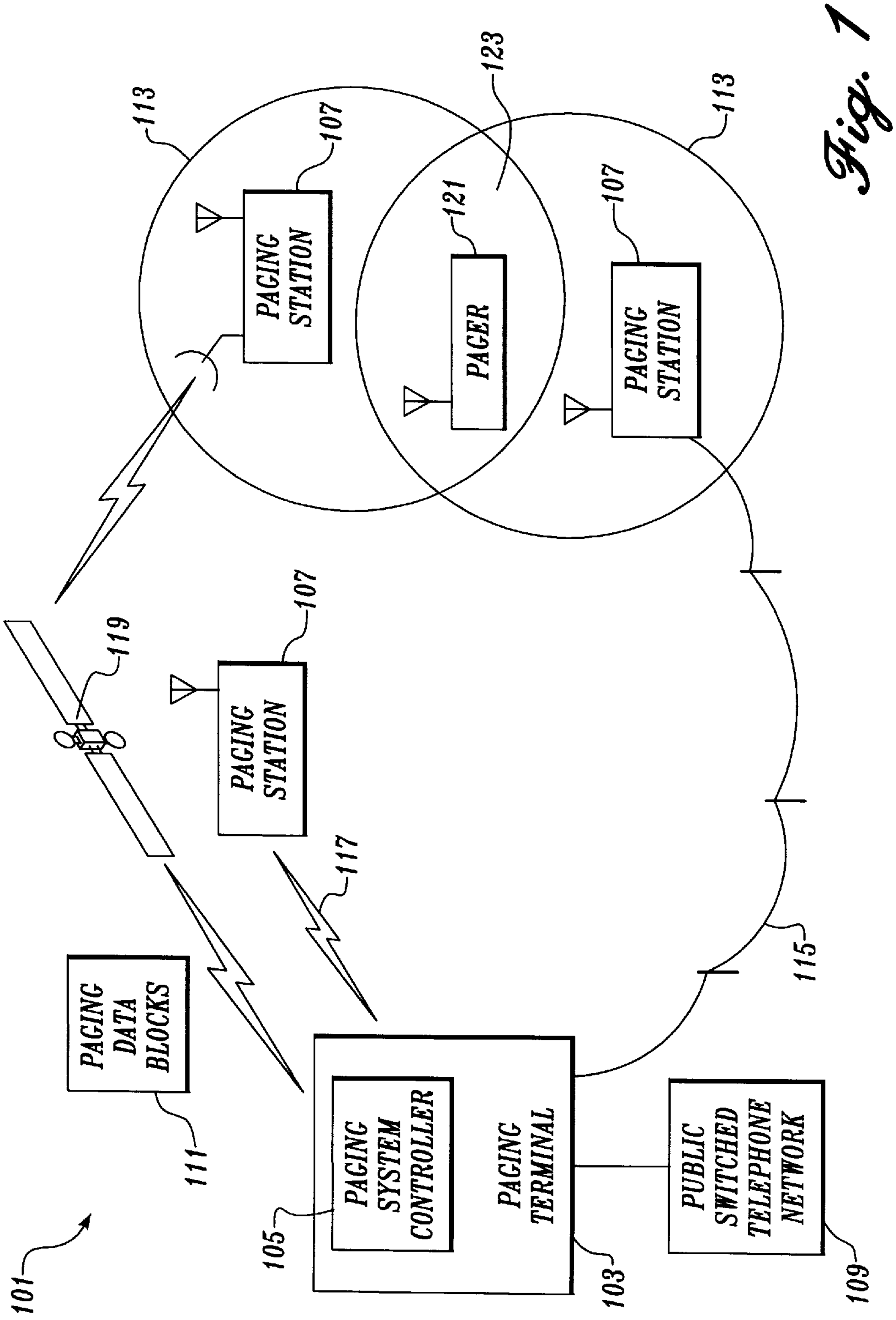
FIG. 1 is a schematic diagram illustrating an exemplary simulcast paging system.

FIG. 1 illustrates a paging system incorporating the method and apparatus of the present invention. The paging system 101 includes a paging terminal 103, a paging system controller 105, and a number of paging stations 107 that are spread over a wide geographic area. In this embodiment of the present invention, the paging system controller 105 is integral with the paging terminal 103 as shown in FIG. 1.

The paging terminal 103 is connected to a public switched telephone network (PSTN) 109 for receiving incoming telephone calls that comprise requests to page individuals who subscribe to the paging system 101. In response to the incoming calls, the paging terminal 103 creates pages transmitted by the paging terminal 103 to the paging system controller 105. The paging system controller 105 bundles the pages into paging data blocks (PDBs) 111 that are forwarded to the paging stations 107. The paging stations 107 in turn broadcast the pages over a specific geographic area, as represented by circles 113 for the exemplary paging stations that are shown in FIG. 1. The actual method by which the PDBs 111 are forwarded to the paging stations 107 depends on such factors as the hardware of the paging stations, the distance to the paging stations, and/or the economics of employing specific forwarding systems. For example, PDBs 111 can be forwarded over hardwire or fiberoptic telephone link 115. Other paging stations 107 are configured to receive the PDBs 111 over a microwave link 117, while still others receive them over a satellite link 119.

In a simulcast paging system, the paging stations 107 are operative so that the pages are broadcast at exactly the same instant. This simulcasting ensures that when a pager/receiver 121 is in an area where broadcast from two or more paging stations 107 can be received, as represented by the overlap region 123 between circles 113, the pager 121 received a signal that can be readily processed.

Each of the paging stations 107 includes a transmitter having an modulator. The modulator is used for modulating the pages onto a carrier signal, which the transmitter amplifies and broadcasts. One or more pages may be broadcast in a single RF signal burst. For frequency modulation broadcast systems, the carrier signal's frequency is modulated. Thus, the modulator closely controls the frequency of the transmitted signal. In this embodiment, the modulator is capable of modulating the carrier signal according to multiple paging protocols (e.g., POCSAG and FLEX™) and time multiplexing pages of different protocols. In accordance with the present invention, the modulator (described below in conjunction with FIGS. 2–4) is easily reconfigured to provide frequency offsets depending on the transmission protocol. More specifically, in one embodiment, the modulator is easily reconfigured to provide random frequency offsets within a predetermined range.

Figure 2:
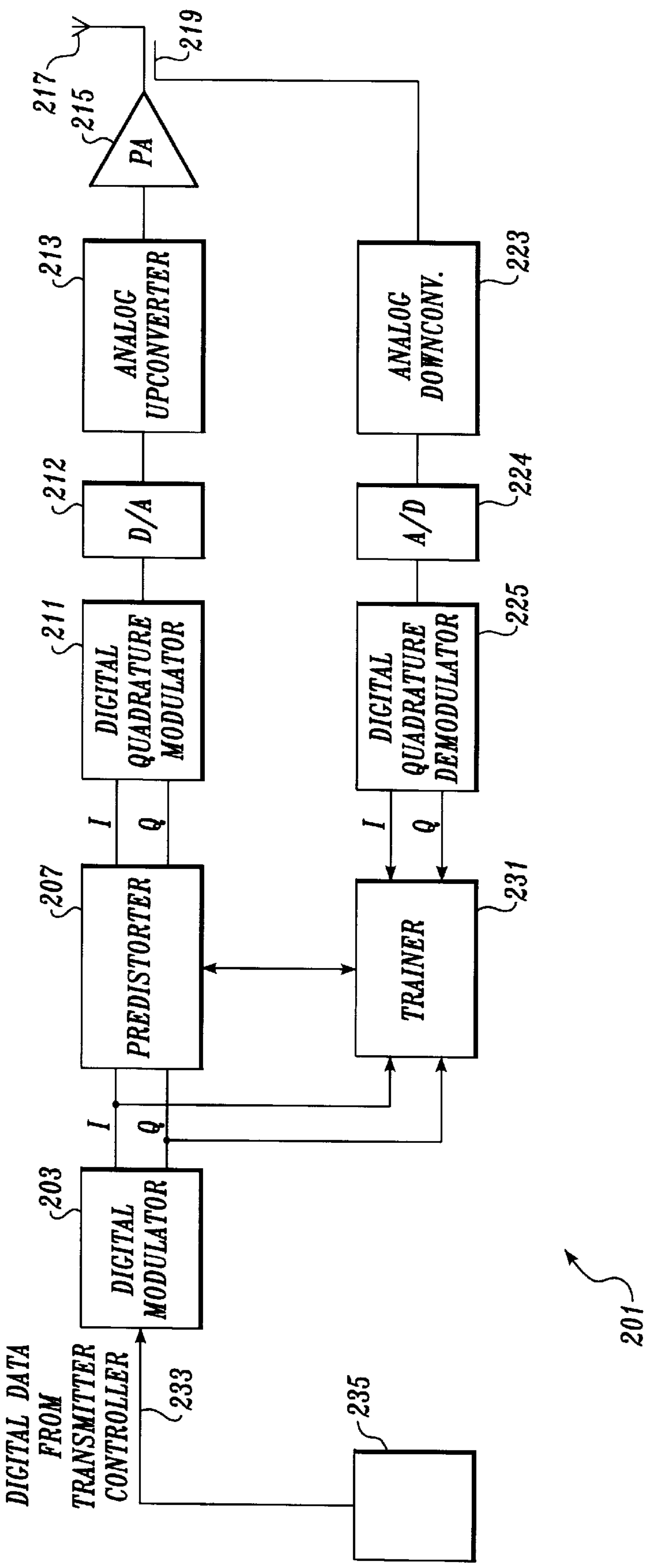
FIG. 2 is a block diagram illustrating a transmitter with predistortion according to one embodiment of the present invention.

FIG. 2 is a block diagram of a transmitter 201 of a paging station 107 (FIG. 1) according to one embodiment of the present invention. The transmitter 201 is similar to the linear transmitter disclosed in the aforementioned copending and commonly assigned U.S. patent application Ser. No. 08/601,118. In a forward signal processing path, the transmitter 201 includes a modulator 203, a predistorter 207, a digital quadrature modulator 211, a digital-to-analog converter 212, an analog upconverter 213, a power amplifier 215 and a transmitting antenna 217. A feedback loop of the transmitter includes a directional coupler 219 (between the power amplifier 215 and the antenna 217), an analog downconverter 223, an analog-to-digital converter 224, a digital quadrature demodulator 225, and a trainer 231. The trainer is coupled to receive the output signals of the digital modulator 203 and interact with the predistorter 207. In other embodiments, additional power amplifiers may be connected in parallel with the power amplifier 215 to increase the gain of the transmitter 201.

In this embodiment, the predistorter 207, the digital quadrature modulator 211, the digital-to-analog converter 212, the analog upconverter 213, the power amplifier 215, the transmitting antenna 217, the directional coupler 219, the analog downconverter 223, the analog-to-digital converter 224, the digital quadrature demodulator 225, and the trainer 231 are implemented in a substantially similar manner as the corresponding elements described in the aforementioned U.S. patent application Ser. No. 08/601,118. The implementation of the modulator 203 is described further below in conjunction with FIGS. 5 and 6.

Digital data that is to be broadcast by the transmitter 201 is provided to the modulator 203, via a line 233. Although in this embodiment the linear transmitter 201 is adapted for use as a paging transmitter, the linear transmitter 201 can be used in any radio frequency (RF) application. In this embodiment, the data received by the modulator 203 is provided from a transmitter controller 235 that is operative to receive data over a link channel from a paging terminal and formulate the data for transmission. The details of the construction of a transmitter controller, and indeed an entire paging system, can be found in U.S. Pat. No. 5,481,258 to Fawcett et al., U.S. Pat. No. 5,365,569 to Witsaman et al. and U.S. Pat. No. 5,416,808 to Witsaman et al., commonly assigned to the assignee of the present invention and incorporated herein by reference. In this embodiment, the transmitter controller 235 provides digital data in non-return to zero (NRZ) format.

In this embodiment, the digital signal provided by the modulator is a series of digital symbols, with each symbol representing a predetermined number of bits. The number of bits per symbol is dependent upon the particular modulation scheme being transmitted by the transmitter 201. Modulation formats in typical paging systems include formats such as, for example, two or four tone frequency shift keying (FSK) modulation and QAM. QAM formats include, for example, a four-level QAM modulation scheme that would have a two-bit symbol. Similarly, four-level FSK modulation schemes (e.g., four-level FLEX™ protocols) also has two-bit symbols.

The inventors of the present invention have observed that pager performance in phase cancellation conditions can depend on the protocol, demodulation scheme, and frequency offset. More specifically, the inventors of the present invention have observed that optimal performance under phase cancellation conditions requires different frequency offsets for different paging protocols. The aforementioned conventional schemes do not appreciate the advantages of selecting frequency offsets according to the transmission protocol to optimize receiver performance. Still further, these conventional schemes do not appreciate the ease-of-use advantages, described below, of randomly selecting frequency offsets from a predetermined range of frequencies optimized according to the transmission protocol.

As a result of these observations, the modulator 203 is designed to introduce a random frequency offset, selected from a predetermined range, to reduce reception errors caused by phase cancellation in the overlap regions (see FIG. 1). The modulator 203 is implemented so as to be reconfigurable to support broadcasts of different paging protocols and, in addition, to time multiplex broadcasts of different protocols. The method and circuitry for providing the random frequency offset is described below in conjunction with FIGS. 3–11.

The modulator 203 is operative to correlate each particular symbol with predetermined in-phase and quadrature output signals. Thus, for each unique symbol, a different combination of in-phase and quadrature component signals for the base band signal is output by the modulator. In this embodiment, the modulator 203 includes a Texas Instruments TMS320C44 microprocessor that is programmed to perform the in-phase and quadrature modulation on the symbols (described below in conjunction with FIGS. 5 and 6), although any suitable processor or controller may be used.

Additionally, as each symbol is processed, the modulator 203 does not "instantaneously" transition from one symbol to another. Such an instantaneous change in in-phase and quadrature output signals would result in high frequency harmonics in the system. Instead, by means of digital filtering, a smooth transition between symbols (and therefore in-phase and quadrature output signals) is achieved. One embodiment of this technique which is applicable to an FSK system is disclosed in more detail in U.S. Pat. No. 5,418,818 to Marchetto et al., assigned to the same assignee as the present invention and incorporated herein by reference.

Next, the in-phase and quadrature component signals output by the modulator 203 are input into the predistorter 207. The predistorter 207 is operative to modify the in-phase and quadrature component signals output from the modulator 203 so as to compensate for any distortion that takes place in the power amplifier 215. The compensation provided by the predistorter 207 is controlled by the trainer 231 using any suitable predistortion scheme. The trainer 231 is described in more detail below.

The output of the predistorter 207 is then provided to the digital quadrature modulator 211. The digital quadrature modulator 211 converts the in-phase and quadrature component signals into a single real digital signal. The real digital signal from the digital quadrature modulator 211 is received by a D-A converter 212 that converts the real digital signal to an analog signal, producing an intermediate frequency output signal. For example, the intermediate frequency is approximately 5.6 MHz in a representative embodiment. Because a single D-A converter is used, the distortion caused by the relative delay and amplitude differences introduced in those conventional systems that use separate D-A for in-phase and quadrature signals is substantially eliminated in the transmitter 201.

The intermediate frequency output signal from the D-A converter 212 is provided to the analog upconverter 213, which converts the intermediate frequency signal to a broadcast frequency signal having a frequency within a frequency band of the paging system. For example, the broadcast frequency is approximately 940M in a representative embodiment. The analog upconverter 213 can be any suitable conventional upconverter such as, for example, a mixer receiving a local oscillator signal.

The power amplifier 215 receives the broadcast frequency signal from the analog upconverter 213, amplifies the signal, and provides the amplified signal to the transmitting antenna 217 for transmission. The power amplifier 215 can be any suitable power amplifier such as, for example the power amplifier disclosed in copending U.S. patent application Ser. No. 08/601,370 entitled "High-Power Amplifier Using Parallel Transistors" by M. Walker, which is assigned to the same assignee as the present invention and incorporated herein by reference. In a representative embodiment, four such power amplifiers are used in parallel, but fewer or more can be used in other configurations.

In order to aid in the accurate predistortion of the signal, the feedback loop monitors the amplified signal from the power amplifier 215. In this embodiment, the coupler 219 is a conventional directional coupler positioned relatively close to the antenna 217. The signal from the coupler 219 is provided to the analog downconverter 223.

The analog downconverter 223 operates in an opposite manner to the analog upconverter 213. In particular, the analog downconverter 223 lowers the frequency of the receive signal outputted by power amplifier 215 to an intermediate frequency. In a preferred embodiment, this intermediate frequency is substantially the same as the intermediate frequency used in the forward signal processing path. Within the analog downconverter 223, there is a series of filtering, amplification, and mixing with local oscillator signals to generate the intermediate frequency signal.

Next, the intermediate frequency signal is converted from an analog intermediate frequency signal into a digital signal. This is accomplished by using a conventional A-D converter 224 such as, for example, an Analog Devices AD9026, which samples the intermediate frequency signal and outputs a digital signal representing the sampled intermediate frequency signal. The digital quadrature demodulator 225 performs a digital quadrature demodulation of the digital signals and outputs the in-phase component signal and the quadrature component signal.

The trainer 231 receives the output signals of the digital quadrature demodulator 225. The trainer 231 also receives the output signals from the modulator 203. Some predistortion algorithms also require the trainer 231 to receive the output signals from the predistorter 207. Thus, in effect, the trainer 231 receives the exact modulated signal that was intended to be sent (the output signals of the modulator 203) and the signal that was transmitted (the output signals of the digital quadrature demodulator 225) in order to ensure that the predistorter 207 correctly compensates for the distortion caused by the power amplifier 215. The trainer 231 and the predistorter 207 can implement any suitable predistortion scheme such as, for example, the scheme disclosed in U.S. Pat. No. 5,049,832 to Cavers. Typically, the trainer provides one or more "trainer" signals to the predistorter that modify the predistorter's response to the in-phase and quadrature signals input to the predistorter.

In addition, the trainer monitors the actual data or voice signals being transmitted to implement the predistortion scheme, as opposed to special sequences (i.e., not normal data or voice signals) as required by some conventional systems. Thus, normal data or voice transmissions need not be interrupted to transmit special data sequences to update the predistorter as in these conventional systems.

Although a linear predistortion transmitter is described, those skilled in the art of paging systems can implement other embodiments that use other types of transmitters without undue experimentation. For example, the modulator can be adapted for use in transmitters of the type disclosed in the aforementioned U.S. Pat. No. 5,418,818 issued to Marchetto et al.

Figure 3:
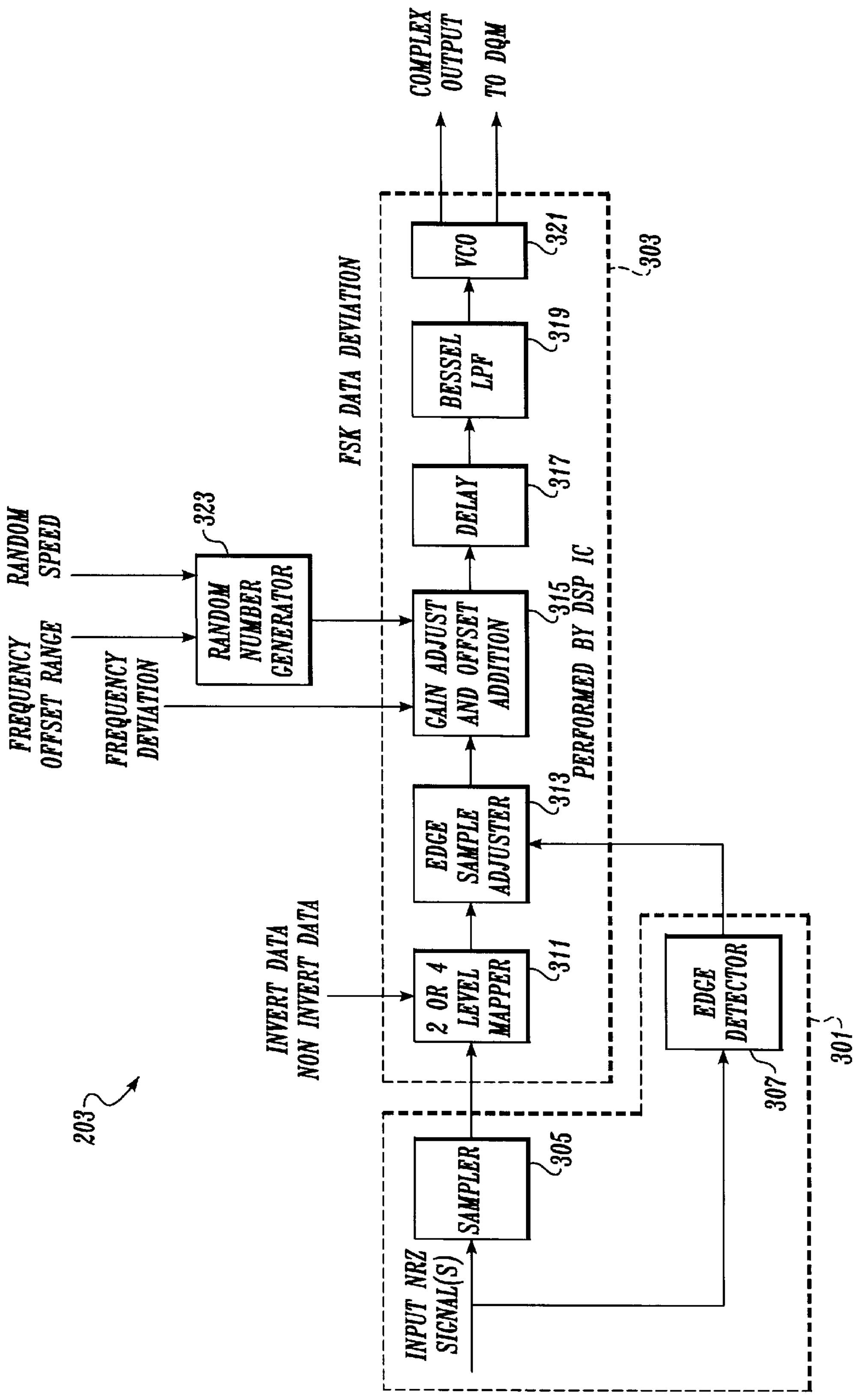
FIG. 3 is a functional block diagram illustrating an modulator according to one embodiment of the present invention.

FIG. 3 is a functional block diagram illustrative of the modulator 203 according to one embodiment of the present invention. The modulator 203 includes an interface portion 301 and a processing portion 303. The interface portion 301 includes a sampler 305 and an edge detector 307. The processing portion 303 includes a mapper 311, an edge sample adjuster 313, a gain adjuster and offset adder (GA/OA) 315, a delay circuit 317, a low pass filter (LPF) 319 and a voltage controlled oscillator (VCO) 321. The modulator also includes a random number generator 323. In this embodiment, the random number generator 323 is implemented in software or firmware executed by the aforementioned TMS320C44 microprocessor. In addition, this microprocessor is programmed to implement the processing portion 303.

Figure 4:
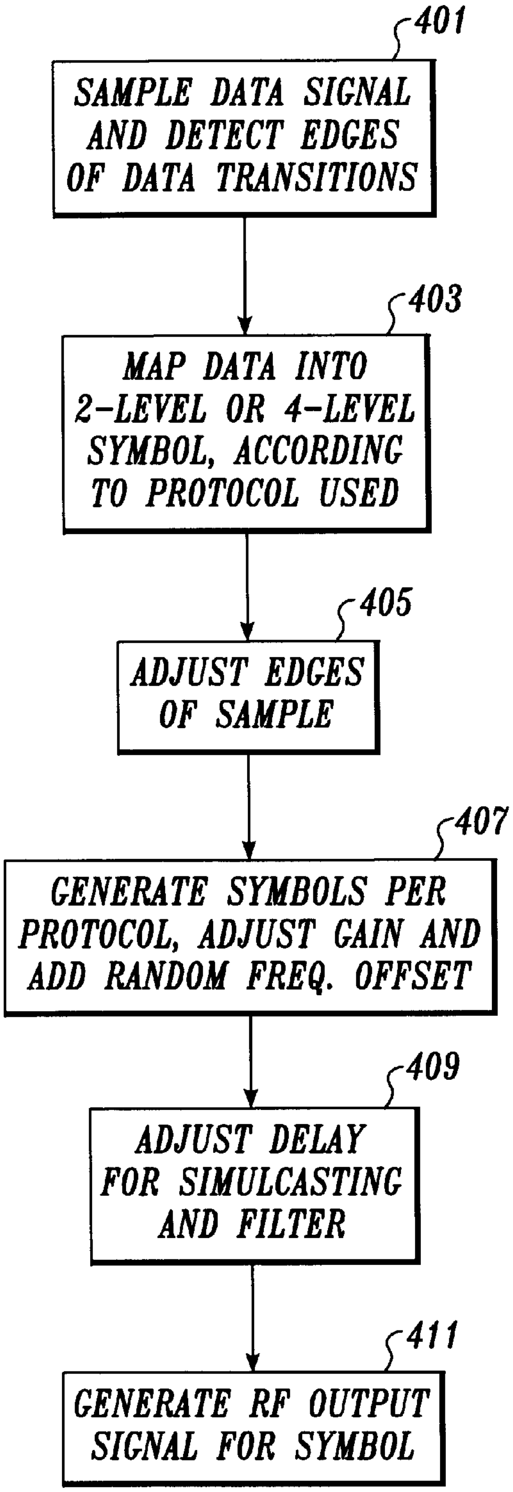
FIG. 4 is a flow diagram illustrating the operation of the modulator depicted in FIG. 3, according to one embodiment of the present invention.

FIG. 4 is a flow diagram illustrating the basic operation of the modulator 203 depicted in FIG. 3 according to one embodiment of the present invention. Thus, with reference to FIGS. 3 and 4, the modulator 203 operates as follows. In a first step 401, the sampler 305 receives the NRZ data signal provided by the transmitter controller 235 (FIG. 2). The NRZ data signal is in the form of a series of bits provided at a predetermined bit rate. The sampler 305 samples the NRZ data signal at a rate at least twice this bit rate and, for each bit, provides a digital output signal having a logic level corresponding to the sampled bit. The edge detector 307 also detects when the logic level of the NRZ data signal transitions and provides a pulse for each transition.

In a next step 403, the mapper 311 receives the digital output signals from the sampler 305. In a two-level protocol scheme, the mapper 311 maps each received bit into the appropriate symbol for the two-level protocol. However, in a four-level protocol scheme, the mapper 311 maps every two bits into the appropriate symbol for the four-level protocol (e.g., four-level FLEX™). As described below in conjunction with FIGS. 5 and 6, in this embodiment, the transmitter controller 235 (FIG. 2) can reconfigure the modulator 203 (including the mapper 311) to modulate according to various protocols without changing the hardware implementation of the transmitter 201 FIG. 2). Alternatively, the exciter controller (not shown) can reconfigure the modulator 203 in other embodiments. Because the configurations can be stored in the modulator 203, the modulator 203 can switch from one configuration to another automatically to "dynamically" or "on-the-fly" (i.e., with little or no significant delay) time multiplex broadcasts of different protocols. Because of this switching capability, a single transmitter can be used to broadcast messages according to at least two different protocols, eliminating the need for a second transmitter and thereby reduce costs. Of course, in other embodiments, switching between protocols need not be "on-the-fly".

Then in a step 405, the edge sample adjuster 313 receives the symbols from the mapper 311 and the pulse timing triggered by the edge detector 307. If necessary, the edge sample adjuster 313 then adjusts the transitions between two symbols to reduce the jitter incurred during the sampling process. This edge sample adjustment is disclosed in the aforementioned U.S. Pat. No. 5,418,818 issued to Marchetto et al.

In a step 407, the symbol from the edge sample adjuster 313 is received by the GA/OA 315. The GA/OA 315 also receives the frequency deviation specified for the current protocol being used. For example, in POCSAG, the deviation is ±4500 Hz, whereas for four-level FLEX™, the frequency deviation is ±4800 Hz and ±1600 Hz. The modulator 203 is programmed with this information, which can easily be reconfigured for other protocols. Further, the modulator 203 can store several different frequency deviations corresponding to several different paging protocols. The transmitter controller 235 controls the modulator 203 to select an appropriate frequency deviation for the current protocol.

In addition, the GA/OA 315 receives a random number, which is generated by the random number generator 323. The random number generator 323 receives a predetermined frequency offset range and a random seed. The random seed can be generated in any suitable conventional manner. In response to the random seed and the frequency offset range, the random number generator 323 generates random numbers corresponding to frequency offsets within the predetermined frequency offset range. The predetermined frequency offset range is optimized for the particular protocol and modulation technique being used. As disclosed in "System Integration of the FLEX™ Paging Protocol" by L. Williams, Mobile Radio Technology, June, 1996, pages 10–26, (part one) and July, 1996, pages 12–18 (part two), it has been observed that data reception errors due to phase cancellation are related to the frequency offset. For example, for the POCSAG protocol, frequency offsets in the range of about ±200 Hz appear to minimize phase cancellation data reception errors. On the other hand, for FLEX™ schemes, frequency offsets in the range of about 0–150 Hz appear to minimize the phase cancellation data reception errors. As with the frequency deviations, these different frequency offset ranges can be stored in the modulator 203 for quick reconfiguration in response to control signal(s) from the transmitter controller 235. The GA/OA 315 then outputs a voltage signal as a function of the frequency deviation for the current protocol and the random number received from the random number generator 323. Because of the digital programmable control of the modulator 203, the transmitter can broadcast pages according to different protocols in a time multiplexed manner with frequency offsets optimized for each protocol.

In this embodiment, the random number generator 323 is implemented in software or firmware. The frequency offset range is programmed into the modulator 203 and can be easily reconfigured to correspond to the protocol being used. In this embodiment, the transmitter controller 235 (FIG. 2) determines what protocol is to be used for the data signal and configures the modulator 203 to use the frequency deviation and frequency offset range corresponding to this protocol. The random number generator can also be used to randomly vary the duration that a particular random frequency offset is used. Alternatively, the duration of the random frequency offset may be predetermined. Still further, the start of the duration may be programmed to be either at a random or predetermined time. Thus, not only can the frequency offset range be controlled, but also the "window" that a particular random frequency offset is used can be controlled. For example, the window can be controlled so that changes in frequency offset occur between symbols, packets or any other subdivision of the page. Alternatively, the frequency offset transitions can be controlled to occur during the transmission of a symbol. Accordingly, the range, duration and timing can be optimized to minimize phase cancellation data reception according to the protocol and modulation scheme being used.

Then in a step 409, the voltage output signal of the GA/OA 315 is received by the delay circuit 317. The delay circuit 317 adjusts the timing of the voltage output signal for simulcast broadcast as described below in conjunction with FIG. 5. Of course, in non-simulcast systems, the delay circuit 317 is not needed. The LPF 319 then filters the voltage output signal to appropriately adjust the rise time of the signal. In this embodiment, the LPF 319 (commonly referred to as the premodulation filter) is a conventional digital LPF implemented in software executed by the aforementioned TMS320C44 microprocessor.

In a next step 411, the filtered voltage signal is received by the VCO 321. The VCO 321 generates a complex output signal having a frequency corresponding the received filtered voltage signal. The VCO 321 is implemented using a look-up table which is accessed by the modulator's TMS320C44 microprocessor. The VCO output signal can then be interpolated as necessary before being received by the next functional block of the transmitter (e.g., predistorter). This process is then repeated for the next NRZ data signal.

Figure 5:
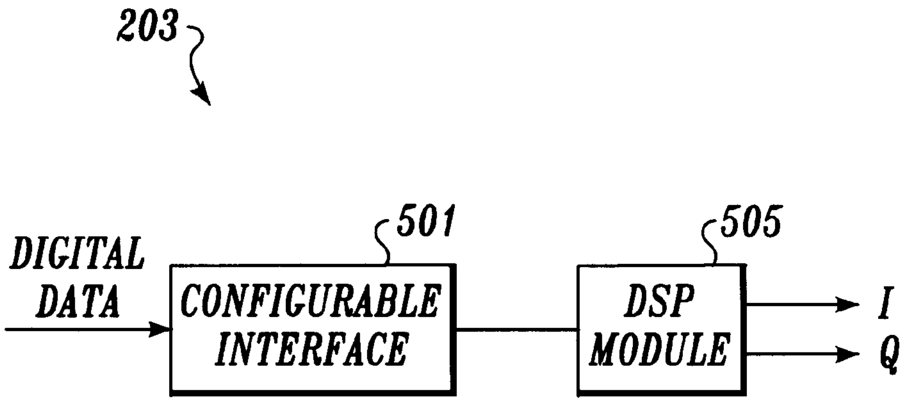
FIG. 5 is a block diagram illustrating a hardware implementation of a modulator according to one embodiment of the present invention.

FIG. 5 is a block diagram of one embodiment of the modulator 203 according to the present invention. The modulator 203 includes a configurable interface 501 and a DSP module 505. The configurable interface 501 is connected to receive digital signals from the transmission controller 235 (FIG. 2). In this embodiment, the configurable interface 501 is implemented with a reprogrammable logic device. Preferably, the reprogrammable logic device is a Xilinx XC4003 field programmable gate array (FPGA), although any suitable reprogrammable logic device can be used. Because a FPGA is used, the configurable interface 501 can be configured to operate with various transmitter controllers.

The configurable interface 501 is connected to the DSP module 505 (described below in conjunction with FIG. 6), which receives real digital signals from the interface 501 and converts them into filtered complex digital signals. The DSP module 505 is programmed to produce the in-phase and quadrature component signals from the digital signal received by the configurable interface 501. As described above, the modulator 203 (more specifically, the DSP module 505) is also programmed with predetermined frequency offset ranges and the frequency deviations of the paging protocols being supported. The DSP module 505 is programmed to generate random numbers within the range defined by the predetermined frequency offset range and the predetermined window optimized for the current protocol and modulation scheme. In addition, the DSP module 505 also implements the LPF 319 and the VCO 321. DSP modules that support these functions are commercially available. Of course, in light of this disclosure, custom or semicustom application specific integrated circuits (ASICs) can also be designed to provide these functions by those skilled in the art without undue experimentation. Additional DSP modules substantially similar to the DSP module 505 (in hardware implementation) may be used to implement a more complex modulation algorithm or to increase the speed of the modulator.

Further, the digital modulator 203 may be programmed to equalize processing delays within the digital modulator itself that arise when the modulation format is changed. For example, the processing delays within the digital modulator for FSK modulation and for AM single sideband (SSB) voice modulation are different. Consequently, for example, when a first set or packet of data signals are modulated using a relatively slow modulation processing format, followed by a second set of data signals using a relatively fast modulation processing format, the digital modulator 203 may experience a fault as the "fast" data overtakes the "slow" data. This delay scheme is also described further in the Marchetto patent.

Figure 6:
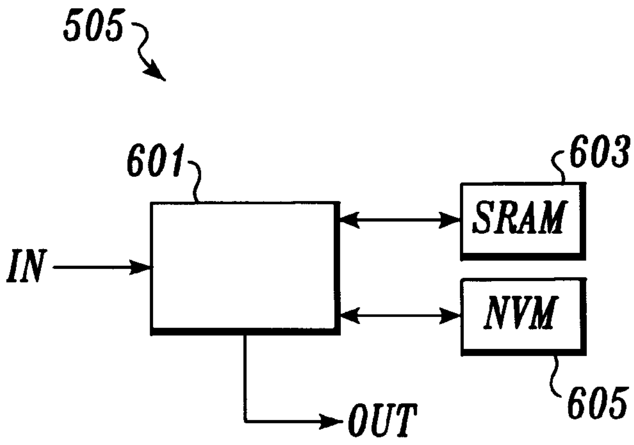
FIG. 6 is a block diagram illustrating a DSP module according to one embodiment of the present invention.

FIG. 6 is a block diagram of a hardware implementation of one embodiment of the DSP module 505 (FIG. 5) according to the present invention. The DSP module 505 includes a microprocessor 601. In this embodiment, the microprocessor 601 is implemented using a TMS320C44 DSP microprocessor integrated circuit device available from Texas Instruments, although any suitable microprocessor device can be used. The microprocessor 601 is connected to a static random access memory (SRAM) 603 and a nonvolatile memory 605. In this embodiment, the nonvolatile memory 605 is implemented using a flash electrically programmable read only memory (EPROM). As a result, the DSP module 505 can be configured or programmed for a variety of functions, such as, for example, forming part of a interpolator, trainer or predistorter, in addition to implementing the modulator. Further, the DSP module 505 can be reprogrammed to change its functionality through the controller 235 (FIG. 2), which can be programmed to replace the configuration program stored in the nonvolatile memory 605. As a result of this reconfigurability, the DSP module 505 can easily be modified to use different paging protocol (s) and to provide different frequency offsets optimized for the different paging protocol(s).

Figure 7:
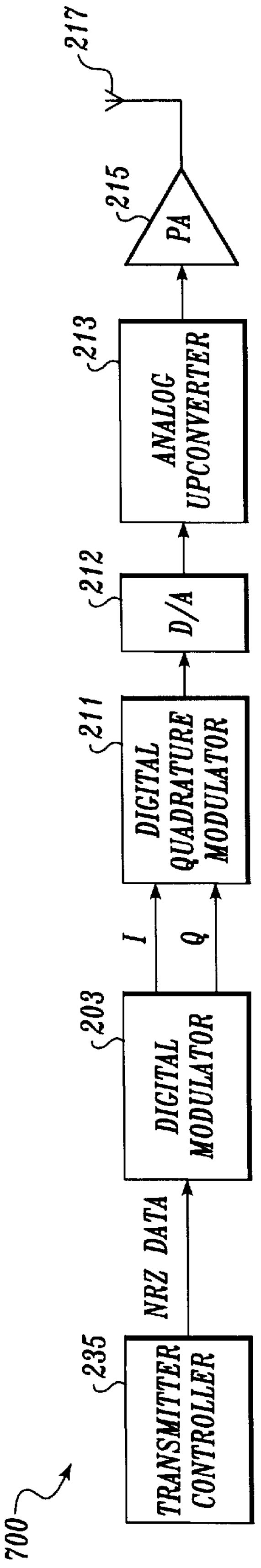
FIG. 7 is a block diagram illustrating a transmitter without predistortion according to another embodiment of the present invention.

FIG. 7 is a block diagram of a FM transmitter 700 without predistortion, according to another embodiment of the present invention. The transmitter 700 is similar to the FM transmitters used in many current simulcast paging systems. In this embodiment, the transmitter 700 includes the transmitter controller 235, the digital modulator 203, the digital quadrature modulator 211, the D/A converter 212, the analog upconverter 213, the power amplifier 215 and the antenna 217, which function as described above in conjunction with FIG. 2. In this embodiment, the transmitter controller 235 includes a model ADSP-2101 digital signal processor available from Analog Devices, together with supporting memory. The hardware implementation of the modulator 203 is similar to the embodiment described above in conjunction with FIGS. 5 and 6, except that the model ADSP-2101 digital signal processor device is used. In this embodiment, the ADSP-2101 digital signal processor is configured by the exciter controller (not shown) instead of the transmitter controller 235 as in the transmitter 201 (FIG. 2) to provide random frequency offsets from a predetermined range on a protocol basis as described below.

FIGS. 8–11B are flow diagrams illustrating the operation of the modulator 203 (FIG. 7). With reference to FIGS. 7–11B, the modulator 203 operates as follows. The modulator performs a step 802 to reset the modulator upon powering up or being reset. During this reset operation, the digital signal processor boots up from a start-up ROM or boot memory. Then in a step 804, the modulator 203 downloads from the boot memory an operational program to the digital quadrature modulator 211, which configures the digital quadrature modulator 211 to operate on the digital signals received from the modulator 203 with the desired quadrature modulation algorithm. In other embodiments, the digital quadrature modulator 211 can perform a download from its own boot memory. In a next step 806, the digital signal processor initializes its control registers and program variables with values from the boot memory. These values allow the digital signal processor to begin normal operation and receive instructions from the exciter controller (not shown). The digital signal processor then receives in a step 808 a set of initial parameter values from the exciter controller for the protocol(s) to be used, and the range, timing, and duration of the frequency offsets for this protocol.

Figure 9:
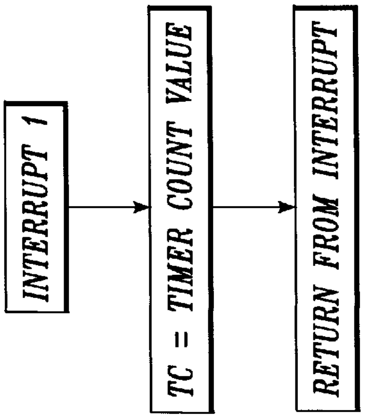
FIGS. 8–11B are flow diagrams illustrating in more detail the operation of the modulator depicted in FIG. 7.

Then in a step 810, the digital signal processor determines whether the edge detector 307 FIG. 3) has detected an edge of a data transition of the NRZ data provided by the controller 235. More specifically, the edge detector 307 sends an interrupt signal to the digital signal processor when a data transition occurs. In response to this interrupt, the digital signal processor performs a step 812 to reduce sampling jitter as disclosed in the aforementioned Marchetto patent. In the step 812, the digital signal processor performs an interrupt routine 1, which is illustrated in FIG. 9. A timer counts the number of clock periods in each period, which is saved in a variable TC at the occurrence of the interrupt. The variable TC is later used in the timer interrupt routine described below in conjunction with FIGS. 11A and 11B. The process then returns to the beginning of the step 810.

Figure 10:
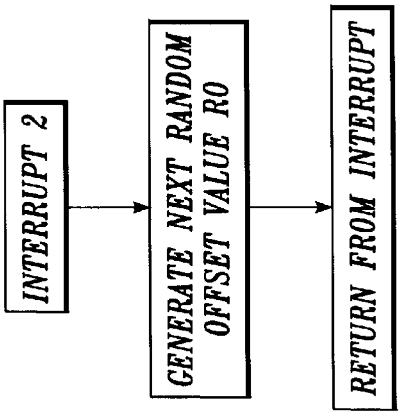

However, if in the step 810 no edge is detected, the digital signal processor performs a step 814. In the step 814, the digital signal processor determines whether the frequency offset should change or "hop". In this embodiment, a timer provides an interrupt signal to indicate that the offset frequency should hop. This timer can be used to provide a known hop rate. In other embodiments, a random number generator may be used in generating this interrupt signal to provide a random hop sequence. If the interrupt is detected, the digital signal processor performs a next step 816 to generate a new random frequency offset from within the predetermined range for the current protocol. In the step 816, the digital signal processor performs an interrupt routine 2, which is illustrated in FIG. 10. In interrupt routine 2, the digital signal processor receives a random number from the random number generator 323 and provides a random frequency offset variable RO corresponding to this random number. This variable RO is later used in the timer interrupt routine described below in conjunction with FIGS. 11A and 11B. The interrupt routine 2 then returns to the beginning of the step 810.

However, if in the step 814 no random offset interrupt is detected, the digital signal processor performs a step 818 in which the digital signal processor determines whether a timer interrupt has occurred. As stated above, the timer counts the number of clock periods in a sampling period. Each sampling period has a known number of clock cycles. When the timer reaches this known number, the timer sends a timer interrupt to the digital signal processor. If no timer interrupt has occurred, the digital signal processor performs a background task during a step 819 and returns to the beginning of the step 810.

Figure 11A:
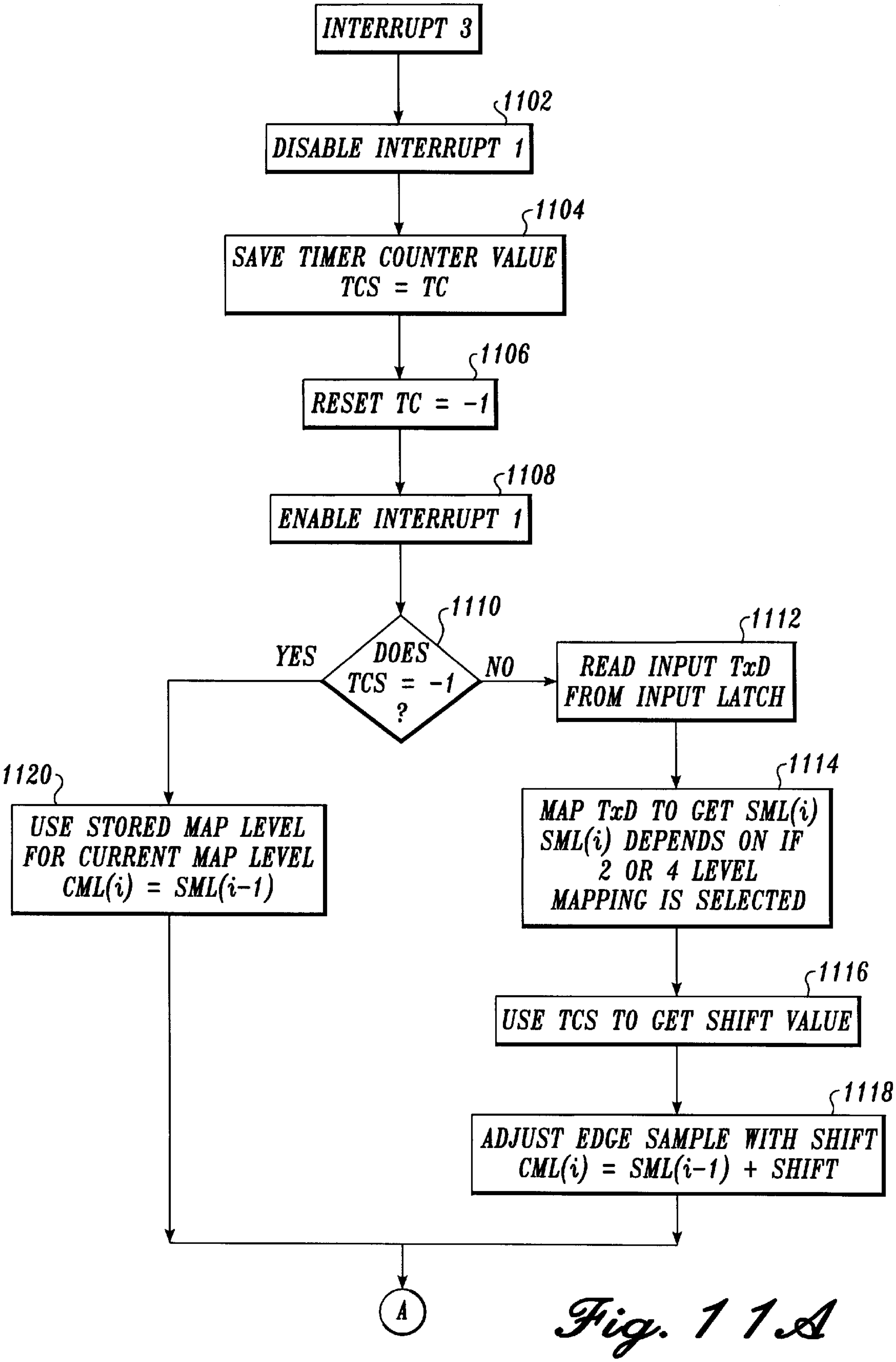
Figure 11B:
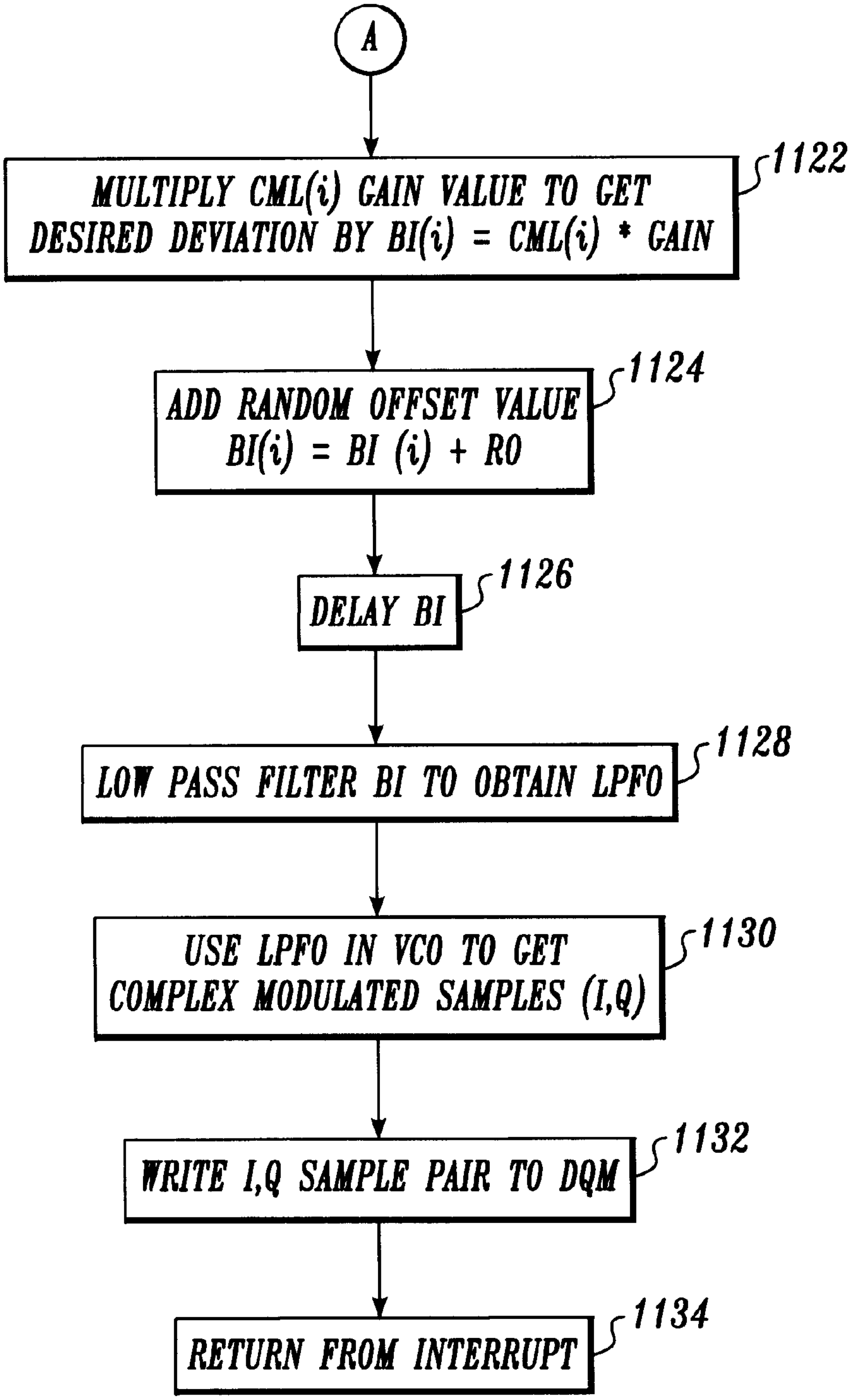

However, if a timer interrupt has occurred, the process proceeds to a step 820 in which the timer is restarted. After the step 820, the digital signal processor performs an interrupt routine 3 in a step 822, which is illustrated in FIGS. 11A and 11B.

In the interrupt routine 3, the digital signal processor first disables the interrupt routine 1 in a step 1102 so that the variable TC is not changed while it is being operated on in the next step. Then in a next step 1104, the digital signal processor saves the value in the variable TC into another variable TCS. As stated above, the variable TC stores the number of clock periods in the sampling period in which a edge was detected. The digital signal processor then sets the variable TC to a −1 in a step 1106. Thus, if the variable TCS also holds a −1 value, then no edge was detected during the present sampling period. The interrupt routine 1 is then enabled in a step 1108 to allow processing of subsequent edge detections.

In a next step 1110, the digital signal processor determines whether a edge detect occurred during the current sampling period. If yes (i.e., TCS does not store a −1 value), then the sampled data is read from an input latch in a step 1112, and then mapped according to the protocol (e.g., two level or four level FLEX™) and saved in a stored map level variable SML(i) for the current sampling period i in a next step 1114. Then in a step 1116, a shift value is determined from the value stored in the TCS variable, as described in the aforementioned Marchetto patent. Next, in a step 1118, the current map level CML(i) is adjusted by adding the stored map level SML(i−1) from the previous sampling period and the shift value.

However, if in the step 1110 an edge detect did not occur, the digital signal processor saves the stored map level SML(i−1) into the current map level CML(i) in a step 1120.

A next step 1122 is performed when both steps 1118 and 1120 are completed. In the step 1122, current map level CML(i) is multiplied by the gain value to result in a value corresponding to frequency deviation for the symbol to be transmitted, according to the current protocol. Thus, the current symbol variable BI(i) is equal to C(i) times the gain. Then in a next step 1124, the value of the random offset variable RO is added to the value of the current symbol variable BI(i) and stored back in the current symbol variable BI(i).

Figure 8:
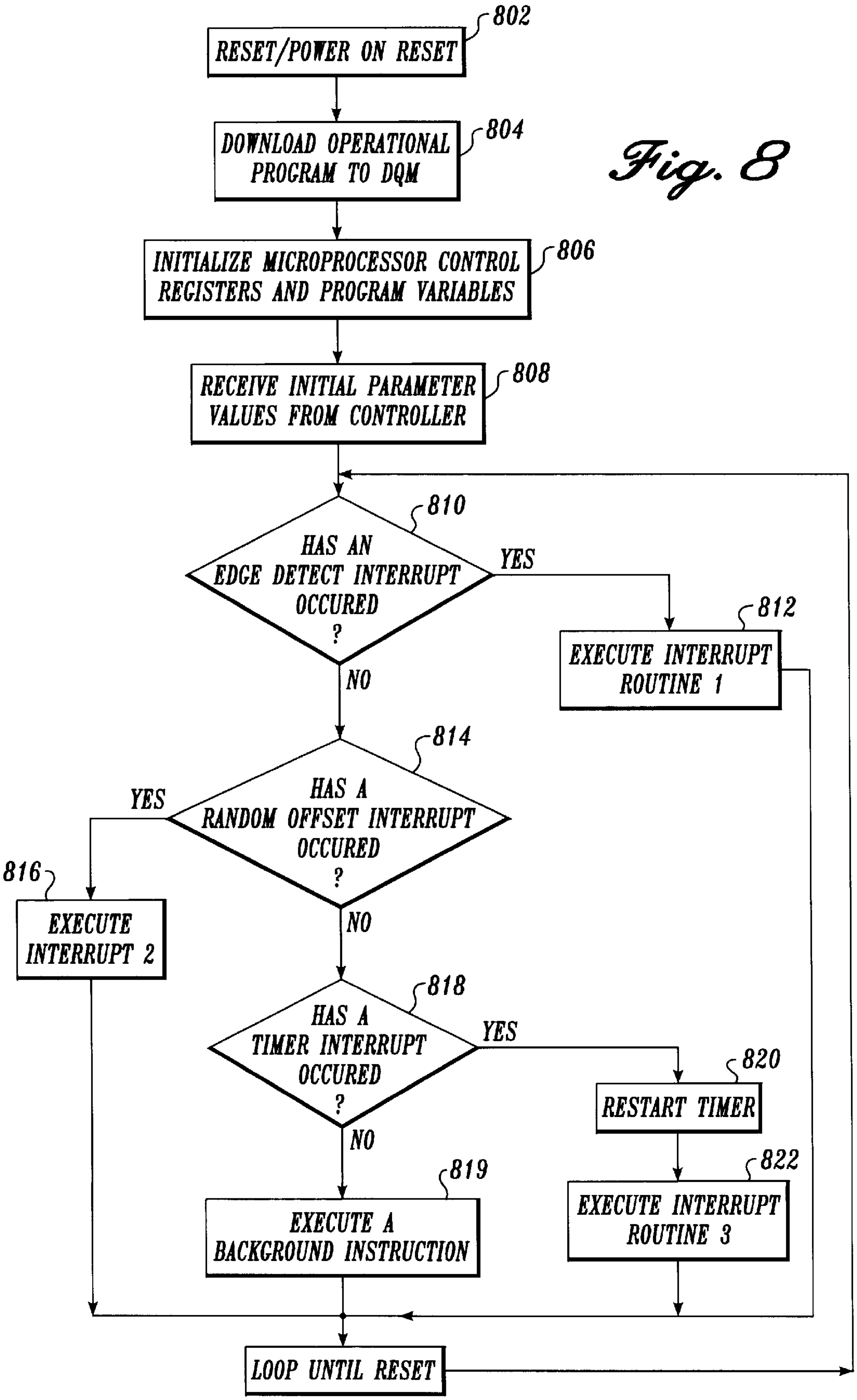

In a next step 1126, the symbol is then delayed as needed for simulcast transmission, as described in the aforementioned Marchetto patent. Then in a step 1128, the symbol is then filtered through an LPF. The output signal of the LPF is then used to access a look-up table that implements a VCO. The VCO outputs a complex modulated signal (i.e., I and Q component signals), which are then provided to the digital quadrature modulator 211. The interrupt routine 3 then ends and returns to beginning of the step 810 (FIG. 8).

The embodiments of the transmitter described above are illustrative of the principles of the present invention and are not intended to limit the invention to the particular embodiments described. For example, while one embodiment has been described in connection with a linear paging transmitter, the random offset generator of the present invention will find application in many broadcast environments. In addition, in light of the present disclosure, the embodiments described above can be adapted for different modulation formats without undue experimentation by those skilled in the art. For example, voice signals modulated by AM SSB can also be supported, as well as multiple subcarriers of such modulated signals. Accordingly, while the preferred embodiment of the invention has been illustrated and described, it will be appreciated that in light of this disclosure, various changes can be made therein without departing from the spirit and scope of the invention.

The embodiments of the invention in which an exclusive property or privilege is claimed are defined as follows:

1. A radio frequency transmitter for use in a simulcast environment, said transmitter comprising:

an input terminal coupled to receive an input signal;

a modulator having an input lead and an output lead, said input lead of said modulator coupled to said input terminal, said modulator being configured to perform a modulation process on a carrier signal using a signal received at said input lead of said modulator, wherein said modulator is configurable to introduce a first frequency offset, a second frequency offset and a third frequency offset to said carrier signal, said first and third frequency offsets being different from each other;

a power amplifier having an input lead coupled to said output lead of said modulator, said power amplifier configured to output an amplified signal dependent on a signal received at said input lead of said power amplifier; and a controller coupled to said modulator, said controller being configured to selectively configure said modulator to introduce said first frequency offset or said third frequency offset to said carrier signal when said transmitter is transmitting signals according to a first protocol, and wherein said controller is confirmed to selectively configure said modulator to introduce said second frequency offset when said transmitter is transmitting signals according to a second protocol, said first frequency offset being predetermined and optimized to minimize the phase cancellation data reception errors for signals transmitted according to said first protocol, and said second frequency offset being predetermined and optimized to minimize the phase cancellation data reception errors for signals transmitted according to said second protocol.

2. The transmitter of claim 1 wherein said controller automatically causes said modulator to introduce said second frequency offset when said transmitter is transmitting signals according to said second protocol.

3. The transmitter of claim 1 wherein a duration, for which said first frequency offset is introduced, is predetermined and optimized to minimize phase cancellation data reception errors for signals being transmitted according to said first protocol.

4. The transmitter of claim 1 wherein said modulator is configured to introduce said first frequency offset to said carrier signal during a first portion of a signal being transmitted according to said first protocol and to introduce said third frequency offset during a second portion of said signal being transmitted according to said first protocol.

5. The transmitter of claim 1 wherein said first and third frequency offsets are essentially randomly generated from within a predetermined range.

6. A radio frequency transmitter for use in a simulcast environment, said transmitter comprising:

an input terminal coupled to receive an input signal;

a modulator having an input lead and an output lead, said input lead of said modulator coupled to said input terminal, said modulator being configured to perform a modulation process on a carrier signal using a signal received at said input lead of said modulator, wherein said modulator is configurable to introduce a first frequency offset, a second frequency offset, and a third frequency offset to said carrier signal;

a power amplifier having an input lead coupled to said output lead of said modulator, said power amplifier configured to output an amplified signal dependent on a signal received at said input lead of said power amplifier; and a controller coupled to said modulator, said controller being configured to selectively configure said modulator to introduce said first frequency offset or said third frequency offset to said carrier signal when said transmitter is transmitting signals according to said first protocol, and wherein said controller is configured to selectively configure said modulator to introduce said second frequency offset when said transmitter is transmitting according to said second protocol, said first frequency offset and said third frequency offset being predetermined and optimized to minimize phase cancellation data reception errors for signals transmitted according to said first transmission protocol, said third frequency offset being different from said first frequency offset, said second frequency offset being predetermined and optimized to minimize phase cancellation data reception errors for signals being transmitted according to said second protocol.

7. The transmitter of claim 6 wherein said modulator is configured to introduce said first frequency offset to said carrier signal during a first portion of a signal being transmitted according to said first protocol and to introduce said third frequency offset during a second portion of said signal being transmitted according to said first protocol.

8. The transmitter of claim 6 wherein said modulator is configurable to introduce a fourth frequency offset to said carrier signal, and wherein said controller is configured to selectively configure said modulator to introduce said fourth frequency offset when said transmitter is transmitting signals according to said second protocol, said fourth frequency offset being predetermined to reduce reception errors for signals transmitted according to said second transmission protocol and being different from said second frequency offset.

9. The transmitter of claim 8 wherein said modulator is configured to introduce said second frequency offset to said carrier signal during a first portion of a signal being transmitted according to said second protocol and to introduce said fourth frequency offset during a second portion of said signal being transmitted according to said second protocol.

10. The transmitter of claim 8 wherein said first and third frequency offsets are within a predetermined range.

11. The transmitter of claim 10 wherein said first and third frequency offsets are essentially randomly generated within said predetermined range.

12. The transmitter of claim 11 wherein the frequencies of said first and third frequency offsets are essentially randomly generated within said predetermined range.

13. The transmitter of claim 12 wherein the durations of said first and third frequency offsets are essentially randomly generated within said predetermined range.

14. The transmitter of claim 10 wherein said predetermined range is reconfigurable.

15. The transmitter of claim 14 wherein said predetermined range is reconfigured by altering data executed by a processor.

16. The transmitter of claim 15 wherein said processor comprises a digital signal processor.

17. A method of reducing phase cancellation in a simulcast paging system, said method comprising;

providing a first frequency offset within a first predetermined range of frequency, said first predetermined range of frequency being predetermined and optimize to minimize phase cancellation data reception errors for signals being transmitted according to a first protocol;

modulating a carrier signal according to said first protocol and combining said first frequency offset with said carrier signal to form a first output signal;

transmitting said first output signal using a transmitter;

providing a third frequency offset from a center frequency within said first predetermined range of frequency, said first and third frequency offsets being different from each other;

modulating said carrier signal according to said first protocol and combining said third frequency offset with said carrier signal to form a third output signal; transmitting said third output signal using said transmitter;

providing a second frequency offset within a second predetermined range of frequency said second predetermined range of frequency being different from said first predetermined range of frequency and being predetermined and optimized to minimize phase cancellation data reception errors for signals being transmitted according to a second protocol;

modulating said carrier signal according to said second protocol and combining said second frequency offset with said carrier signal to form a second output signal; and transmitting said second output signal using said transmitter.

18. The method of claim 13 wherein said first and third output signals are formed in a single signal burst.

19. The method of claim 17 further comprising:

providing a fourth frequency offset within said second predetermined range of frequency, said fourth frequency offset being different from said second frequency offset;

modulating said carrier signal according to said second protocol and combining said fourth frequency offset with said carrier signal for form a fourth output signal; and transmitting said fourth output signal using said transmitter.

20. The method of claim 19 wherein said second and fourth output signals are formed in a single signal burst.

21. The method of claim 9 wherein said first, second, third and fourth frequency offsets are essentially randomly generated within their respective predetermined ranges of frequency.

22. The transmitter of claim 21 wherein the frequencies of said first, second, third, and fourth frequency offsets are essentially randomly generated within their respective predetermined ranges of frequency.

23. The transmitter of claim 22 wherein the durations of said first, second, third, and fourth frequency offsets are essentially randomly generated within their respective predetermined ranges of frequency.

24. The method of claim 17 wherein said first and second predetermined ranges of frequency are reconfigurable.

25. The method of claim 24 wherein said first and second predetermined ranges of frequency are reconfigured by altering data executed by a processor.

26. The method of claim 25 wherein said processor comprises a digital signal processor.

27. The method of claim 17 wherein a duration, for which said first predetermined range of frequency is introduced, is predetermined and optimized to minimize phase cancellation data reception errors for signals being transmitted according to said first protocol.

28. A radio frequency transmitter comprising:

an input terminal coupled to receive an input signal;

an output terminal;

a modulator having an input lead and an output lead, said input lead of said modulator coupled to said input terminal, wherein said modulator is configurable to selectively introduce a first frequency offset or a third frequency offset to a first carrier signal and a second frequency offset to a second carrier signal, said first and third frequency offsets being different from each other;

a power amplifier having an input lead coupled to said output lead of said modulator, said power amplifier configured to provide at said output terminal an amplified signal dependent on a signal received at said input lead of said power amplifier; and a controller coupled to said modulator, said controller being configured to selectively configure said modulator to introduce said first frequency offset or said third frequency offset to said first carrier signal when said transmitter is transmitting signals according to a first protocol and to introduce said second frequency offset to said second carrier signal when said transmitter is transmitting signals according to a second protocol, said first frequency offset being predetermined and optimized to minimize phase cancellation data reception errors for signals transmitted according to said first protocol and said second frequency offset being predetermined and optimized to minimize phase cancellation data reception errors for signals transmitted according to said second protocol.

29. The transmitter of claim 28 wherein:

said first frequency offset is randomly chosen from a first range predetermined to reduce reception errors for signals transmitted according to said first protocol, and said second frequency offset is randomly chosen from a second range predetermined to reduce reception errors for signals transmitted according to said second protocol.

30. The transmitter of claim 29 wherein said first and second ranges are programmable.

31. The transmitter of claim 29 wherein said modulator is configurable to introduce said first frequency offset at a random time.

32. The transmitter of claim 29 wherein said modulator is configurable to introduce said first frequency offset in a predetermined sequence.

33. The transmitter of claim 29 wherein said modulator is configurable to introduce said first frequency offset for a random duration.

34. The transmitter of claim 29 wherein said modulator is configurable to introduce said first frequency offset for a predetermined time duration.

35. The transmitter of claim 29 wherein said controller automatically causes said modulator to introduce said first frequency offset when said transmitter is transmitting signals according to said first protocol and to introduce said second frequency offset when said transmitter is transmitting signals according to said second protocol.

36. The transmitter of claim 35 wherein said modulator is remotely reprogrammable.

37. The transmitter of claim 29 wherein said transmitter is used in a simulcast paging system.

38. The transmitter of claim 29 wherein said modulator comprises a digital signal processor.

39. A radio frequency transmitter for use in a simulcast environment, said transmitter comprising;

an input terminal coupled to receive an input signal;

a modulator having an input lead and an output lead, said input lead of said modulator coupled to said input terminal said modulator being configured to perform a modulation process on a carrier signal using a signal received at said input lead of said modulator;

a power amplifier having an input lead coupled to said output lead of said modulator, said power amplifier configured to output an amplified signal dependent on a signal received at said input lead of said power amplifier; and a controller coupled to said modulator, wherein said controller is configured to selectively cause said modulator to introduce one of a plurality of frequency offsets to said carrier signal in a hop sequence when said transmitter is transmitting signals according to a first protocol, said plurality of frequency offsets being predetermined and optimized to minimize phase cancellation data reception errors for signals transmitted according to said first protocol, and said controller being further configured, when said transmitter is transmitting signal according to a second protocol, to selectively cause said modulator to introduce a frequency offset predetermined and optimized to minimize phase cancellation data reception errors for signals transmitted according to said second protocol.

40. The transmitter of claim 39 wherein the hop sequence is predetermined.

41. The transmitter of claim 39 wherein the hop sequence is randomized.

* * * * *

UNITED STATES PATENT AND TRADEMARK OFFICE

CERTIFICATE OF CORRECTION

PATENT NO. : 5,913,172
APPLICATION NO. : 08/751226
DATED : June 15, 1999
INVENTOR(S) : M.J. McCabe et al.

It is certified that error appears in the above-identified patent and that said Letters Patent is hereby corrected as shown below:

On The Title page,

| | | |
|---|---|---|
| Item [73] | Assignee | "Blaine, Wash." should read --Charlotte, N.C.-- |
| Col. 13 Claim 1 | line 47 | After "second frequency offset" insert --,-- |
| Col. 13 Claim 1 | line 60 | "confirmed" should read --configured-- |
| Col. 15 Claim 17 | line 29 | After "comprising" delete ";" and insert therefor --:-- |
| Col. 15 Claim 17 | line 32 | "optimize" should read --optimized-- |
| Col. 15 Claim 17 | line 46 | After "signal;" insert a paragraph return |
| Col. 15 Claim 17 | line 49 | "frequency said" should read --frequency, said-- |
| Col. 15 Claim 18 | line 61 | "of claim 13" should read --of claim 17-- |
| Col. 16 Claim 19 | line 3 | "for form" should read --to form-- |
| Col. 16 Claim 21 | line 10 | "of claim 9" should read --of claim 19-- |
| Col. 18 Claim 39 | line 2 | After "comprising" delete ";" and insert therefor --:-- |

UNITED STATES PATENT AND TRADEMARK OFFICE

CERTIFICATE OF CORRECTION

PATENT NO. : 5,913,172
APPLICATION NO. : 08/751226
DATED : June 15, 1999
INVENTOR(S) : M.J. McCabe et al.

It is certified that error appears in the above-identified patent and that said Letters Patent is hereby corrected as shown below:

Col. 18 line 6 After "terminal" insert --,--
Claim 39

Signed and Sealed this

Twenty-fourth Day of July, 2007

JON W. DUDAS
*Director of the United States Patent and Trademark Office*